United States Patent
Orvendal et al.

(10) Patent No.: US 7,873,742 B1
(45) Date of Patent: Jan. 18, 2011

(54) PROVIDING CONTENT PER DELIVERY ENDPOINT

(75) Inventors: Per-Ola Anders Orvendal, Redmond, WA (US); Matthew Christian Carlson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1308 days.

(21) Appl. No.: 10/717,880

(22) Filed: Nov. 20, 2003

(51) Int. Cl.
G06F 15/16 (2006.01)

(52) U.S. Cl. .............. 709/236; 709/220; 709/221; 709/201; 709/217; 707/613

(58) Field of Classification Search .......... 709/236, 709/201, 217, 220, 221; 707/613
See application file for complete search history.

(56) References Cited

U.S. PATENT DOCUMENTS

| | | | | |
|---|---|---|---|---|
| 5,864,870 | A * | 1/1999 | Guck | 707/104.1 |
| 6,317,131 | B2 * | 11/2001 | Basso et al. | 345/474 |
| 6,345,279 | B1 * | 2/2002 | Li et al. | 707/104.1 |
| 6,360,252 | B1 * | 3/2002 | Rudy et al. | 709/206 |
| 6,446,118 | B1 * | 9/2002 | Gottlieb | 709/217 |
| 6,463,462 | B1 * | 10/2002 | Smith et al. | 709/206 |
| 6,708,217 | B1 * | 3/2004 | Colson et al. | 709/231 |
| 6,763,384 | B1 | 7/2004 | Gupta et al. | |
| 6,980,993 | B2 * | 12/2005 | Horvitz et al. | 707/102 |
| 7,061,928 | B2 * | 6/2006 | Giroti et al. | 370/422 |
| 7,207,008 | B1 | 4/2007 | Koch | |
| 7,219,163 | B2 * | 5/2007 | Robinson et al. | 709/246 |
| 7,243,130 | B2 * | 7/2007 | Horvitz et al. | 709/207 |
| 7,249,159 | B1 * | 7/2007 | Horvitz et al. | 709/206 |
| 7,277,951 | B2 * | 10/2007 | Marriott et al. | 709/228 |
| 7,346,668 | B2 * | 3/2008 | Willis | 709/219 |
| 7,418,472 | B2 * | 8/2008 | Shoemaker et al. | 709/203 |
| 7,457,879 | B2 * | 11/2008 | Horvitz et al. | 709/227 |
| 7,496,630 | B2 * | 2/2009 | Arellano et al. | 709/206 |
| 7,539,747 | B2 * | 5/2009 | Lucovsky et al. | 709/224 |
| 7,545,762 | B1 * | 6/2009 | McConnell et al. | 370/310.2 |
| 7,548,932 | B2 * | 6/2009 | Horvitz et al. | 1/1 |
| 7,613,702 | B2 * | 11/2009 | Horvitz et al. | 1/1 |
| 7,613,721 | B2 * | 11/2009 | Horvitz et al. | 1/1 |
| 7,613,722 | B2 * | 11/2009 | Horvitz et al. | 1/1 |
| 2002/0049817 | A1 * | 4/2002 | Drory et al. | 709/206 |
| 2002/0120711 | A1 | 8/2002 | Bantz et al. | |
| 2003/0097485 | A1 | 5/2003 | Horvitz et al. | |
| 2003/0100326 | A1 | 5/2003 | Grube et al. | |
| 2003/0101190 | A1 | 5/2003 | Horvitz et al. | |
| 2003/0110234 | A1 * | 6/2003 | Egli et al. | 709/217 |

(Continued)

OTHER PUBLICATIONS

Wang et al., "The SIMBA User Alert Service Architecture for Dependable Alert Delivery," Proceedings of the International Conference on Dependable Systems and Networks, 2001, pp. 463-472, Institute of Electrical and Electronics Engineers, Inc., U.S.A.

(Continued)

Primary Examiner—Dohm Chankong
(74) Attorney, Agent, or Firm—Senniger Powers LLP (57) ABSTRACT

Selecting content for processing based on user device preferences and characteristics of the user devices. Embodiments of the invention include a notification having different content formatted for a plurality of different user devices. In this manner, the content provider delivers content without knowing a priori the specific user device that will process the content. The content includes non-rendered content such as extensible markup language (XML) data.

21 Claims, 4 Drawing Sheets

U.S. PATENT DOCUMENTS

| | | | |
|---|---|---|---|
| 2003/0120785 A1 | 6/2003 | Young | |
| 2003/0131073 A1 | 7/2003 | Lucovsky et al. | |
| 2003/0131142 A1 | 7/2003 | Horvitz et al. | |
| 2003/0135556 A1 | 7/2003 | Holdsworth | |
| 2003/0167334 A1* | 9/2003 | Butler | 709/227 |
| 2003/0221014 A1* | 11/2003 | Kosiba et al. | 709/231 |
| 2004/0083291 A1* | 4/2004 | Pessi et al. | 709/227 |
| 2004/0181550 A1* | 9/2004 | Warsta et al. | 707/104.1 |
| 2004/0242322 A1* | 12/2004 | Montagna et al. | 463/29 |
| 2004/0267965 A1* | 12/2004 | Vasudevan et al. | 709/250 |
| 2005/0080911 A1* | 4/2005 | Stiers et al. | 709/230 |
| 2007/0198691 A1 | 8/2007 | Koch | |

OTHER PUBLICATIONS

Miller et al., "News On-Demand for Multimedia Networks," Proceedings of the First ACM International Conference on Multimedia, 1993, pp. 383-392, ACM Press, New York, U.S.A.

Faensen et al., "Hermes: A Notification Service for Digital Libraries," Proceedings of the First ACM/IEEE-CS Joint Conference on Digital Libraries, 2001, pp. 373-380, ACM Press, New York, U.S.A.

Huang et al., "Publish/Subscribe in a Mobile Environment," Second ACM International Workshop on Data Engineering for Wireless and Mobile Access, 2001, pp. 27-34, ACM Press, New York, U.S.A.

* cited by examiner

PROVIDING CONTENT PER DELIVERY ENDPOINT

TECHNICAL FIELD

Embodiments of the present invention relate to the field of notifications. In particular, embodiments of this invention relate to processing a notification that defines a different content format for each type of end user computing device.

BACKGROUND OF THE INVENTION

An alert message delivers news updates and other information to users. Users receive the alerts on a variety of network devices such as desktop computers, mobile computers, handheld computers, personal digital assistants, and mobile phones. In current systems, all devices use the same message. As such, these systems remove formatting from the content within the alert message so that the same content can be displayed on the multitude of receiving network devices. Such systems fail to allow content providers to specify different content per endpoint device and to send longer messages.

Accordingly, a system for processing notifications including content formatted for use by a plurality of receiving network devices is desired to address one or more of these and other disadvantages.

SUMMARY OF THE INVENTION

Embodiments of the invention include a data structure having content formatted for use by a plurality of receiving network devices. In an embodiment, the invention selects content for processing based on user preferences and user device characteristics. The invention enables the sender of a message (e.g., alert) to specify an end-point format to control the appearance of the alert on the device or application receiving the alert. The invention provides a superior user experience because the user receives superior presentation or processing of the message by the user device or application consuming the message. In this manner, users receive a richer alert at their endpoint as the alerts service or the endpoint selects the appropriate content based on the capabilities of the endpoint.

In accordance with one aspect of the invention, a method processes a notification. The method includes accessing a data packet that represents the notification. The data packet has at least one content type attribute. The content type attribute has an associated content data attribute storing non-rendered content data. The method also includes determining at least one characteristic of a user device based on a capability of the user device to process content data. The method also includes selecting one of the content type attributes for processing by the user device based on the determined characteristic.

In accordance with another aspect of the invention, one or more computer-readable media have computer-executable components for processing a notification. The components include an interface component to access a data structure representing the notification. The data structure has one or more content type fields each having an associated content data field. One of the content type fields has an associated content data field storing non-rendered content data. The components also include a configuration component to determine at least one characteristic of a computing device based on a capability of the user device to process content data. The components also include a filter component to select one of the content type fields from the data structure accessed by the interface component for processing by the computing device based on the characteristic determined by the configuration component.

In accordance with yet another aspect of the invention, a computer-readable medium stores a data structure representing a notification. The data structure includes a plurality of content type attributes each storing a value identifying a content type. The data structure also includes a content data attribute for each of the plurality of content type attributes. The content data attribute stores content data of the content type identified by the content type attribute corresponding thereto. One of the content type attributes has an associated content data attribute storing non-rendered content data. A computing device selects one of the content type attributes and processes the content data stored in the associated content data attribute.

In accordance with still another aspect of the invention, a system processes a notification. The system includes a first memory area to store routing preferences of a user. The system also includes a second memory area to store a device characteristic of one or more computing devices associated with the user. The system also includes an alerts service adapted to receive a data packet from a content provider and deliver the received data packet to the computing devices based on the routing preferences stored in the first memory area and the device characteristic stored in the second memory area. The received data packet includes non-rendered content for use by the user device.

In accordance with another aspect of the invention, a method processes a notification to be delivered to a user device via a data communication network. The method includes accessing, prior to delivery of the notification, a data packet representing the notification. The data packet has at least one content type attribute. The content type attribute has an associated content data attribute storing non-rendered content data. The method also includes determining at least one characteristic of a user device based on a capability of the user device to process content data. The method also includes selecting one of the content type attributes for processing by the user device upon delivery of the notification based on the determined characteristic. The method also includes sending the notification to the data communication network as a function of the selected content type attribute to provide content data formatted for the user device.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

In an embodiment, the invention includes processing a notification by selecting content for processing based on user device preferences and characteristics. In particular, the invention includes a data structure having content formatted for use by a plurality of receiving network devices.

Alerts Environment

Figure 1:
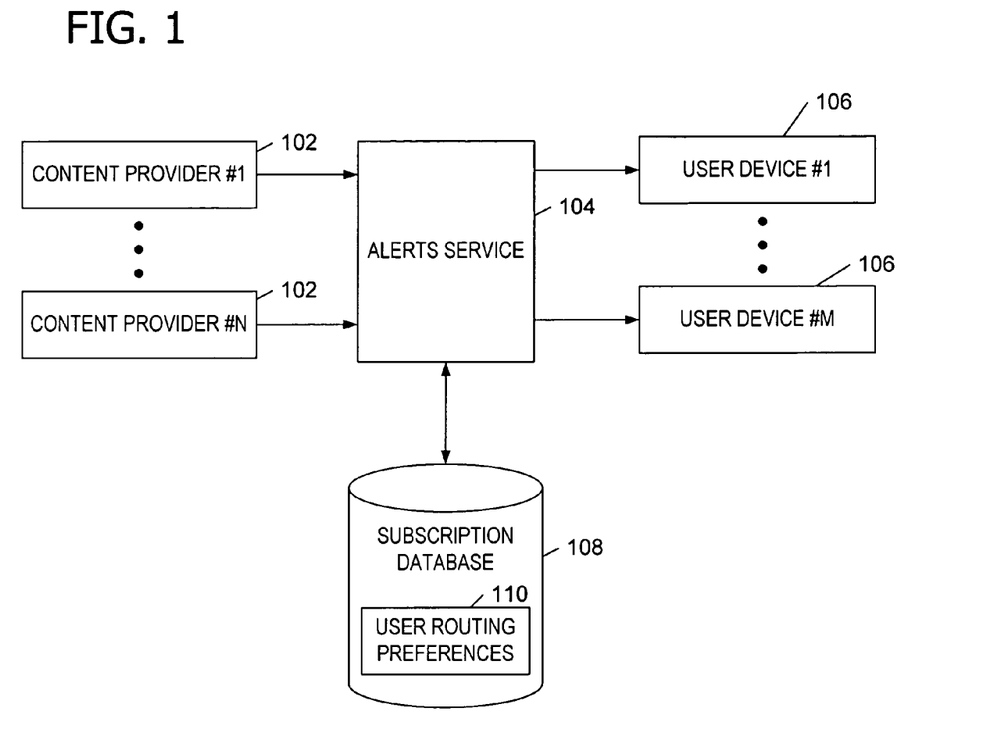
FIG. 1 is a block diagram illustrating one example of a suitable alerts service environment in which the invention may be implemented.

Referring first to FIG. 1, an exemplary block diagram illustrates one example of a suitable alerts service environment in which the invention may be implemented. In one example, the alerts service environment is referred to as a notification pipeline and database (NPD). FIG. 1 illustrates the communication flow between a content provider 102 such as content provider #1 through content provider #N, an alerts service 104, and a user device 106 such as user device #1 through user device #M. The content provider 102, the alerts service 104, and the user device 106 are coupled to a data communication network such as described with reference to FIG. 4 (see below). The content provider 102 sends an alert to the alerts service 104 for delivery to one or more of the user devices 106. The alerts service 104 accesses a subscription database 108 storing user routing preferences 110 to determine which user device(s) 106 should receive the alert. The alerts service 104 then delivers the alert to the determined user device 106. In one embodiment, the alerts service 104 is a messaging system (e.g., an electronic mail server) or part of a messaging system.

The user device 106 may be a computer such as computer 130 described with reference to FIG. 4. Exemplary user devices 106 include instant messaging devices, mobile devices, email, and other devices capable of receiving alerts. In one embodiment, some or all of the functionality of the alerts service 104 is incorporated into the user device 106. For example, the user device 106 may execute an alerts application (e.g., an instant messaging application) that receives and processes alerts. The alerts application executes on the user device 106 such as a cellular telephone (e.g., a smartphone device), a pager, and a handheld computing device (e.g., a personal digital assistant or a Pocket PC device). Further, the user device 106 may include any of the above exemplary devices enabled with an information service such as a SMART PERSONAL OBJECTS TECHNOLOGY (SPOT) brand of telecommunication service and/or devices. The information service comprises a computing infrastructure (e.g., a telecommunication service) for sending data and information to personal and home devices via computer networks, wireless networks and the Internet. User devices 106 which may be enabled with the information service include, but are not limited to, the following devices: clocks, alarm clocks, radios incorporating clocks, watches, billfolds, wallets, checkbook and passbook wallets, purses, pens, metal key rings, key holders, wireless devices, computer hardware (e.g., peripherals, monitors, and displays), electronic calendar devices, and refrigerator magnets. Further, magazines, books, and user manuals relating to computers, computer programs, personal information devices and wireless communications may also incorporate the information service. The information service enables billions of devices to communicate with each other. For example, customers select the type of information and services they want to receive on the enabled devices via a configuration web page. This content is subsequently beamed to and displayed on the device. Information available to users on devices using the information service includes personal messages, calendar updates, and customized news, weather, financial and sports information.

The alerts service 104 of FIG. 1 is merely an example of a suitable embodiment. Other suitable embodiments not shown in FIG. 1 are within the scope of the invention. For example, the content provider 102 may be a user sending content (e.g., a message) from a computing device such as a personal computer to the user device 106 such as a telephone capable of receiving messages. Such an embodiment lacks a centralized alerts service such as alerts service 104. The user device 106 selects the content from the message to process based on various factors affecting processing of the content including screen size, content type, and graphics ability.

Notification Format

Figure 2:
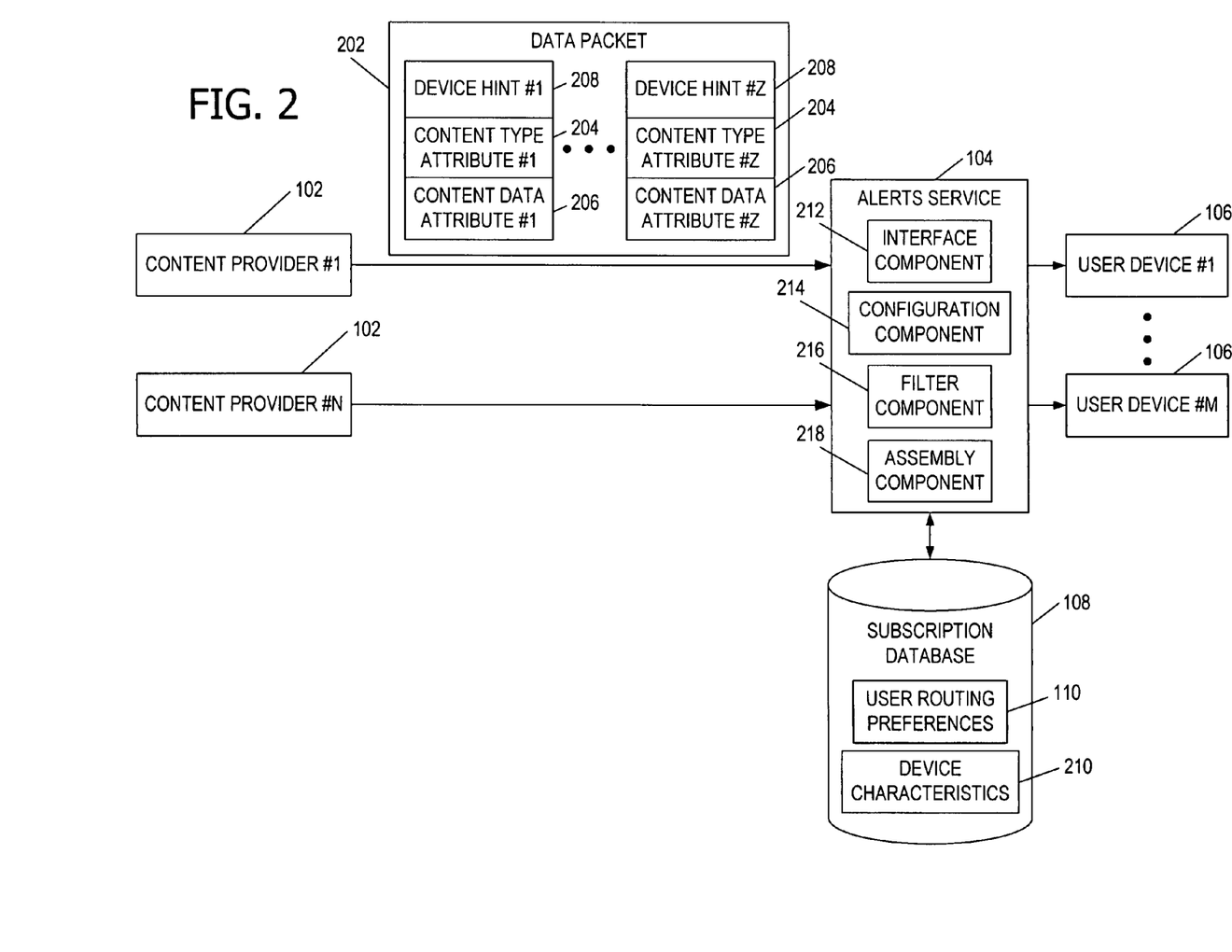
FIG. 2 is an exemplary block diagram illustrating an alerts service environment and a suitable data packet including a notification.

Referring next to FIG. 2, an exemplary block diagram illustrates an alerts service environment and a suitable data packet 202 including a notification. The data packet 202 is stored, for example, as a data structure on a computer-readable medium (e.g., a carrier wave). The data packet 202 includes a plurality of content type attributes 204 such as content type attribute #1 through content type attribute #Z. Each of the content type attributes 204 stores a value identifying a content type. The content type attribute 204 identifies the type of content data or alternatively comprises formatting information for the content data. The invention supports several different content types including, but not limited to, hypertext markup language (HTML), text, graphics, extensible markup language (XML), audio, and video. Further, the content types may include text/plain, text/html, and text/xml. Text/plain and text/html describe renderings of particular content. Text/xml conveys information that is used by an application to take a specific action, but is not rendered per se (e.g., non-rendered). Other content types not specifically listed herein are operable with the invention.

The data packet 202 also includes a content data attribute 206 for each of the plurality of content type attributes 204 such as content data attribute #1 through content data attribute #Z. The content data attribute 206 stores content data of the content type identified by the content type attribute 204 corresponding thereto. In one embodiment, one of the content type attributes 204 has a content data attribute 206 associated therewith storing non-rendered content data. In an embodiment in which the computing device or user device 106 includes a game device, the non-rendered content data includes metadata such as a game identifier. In one example, the entire data packet 202 is about eight kilobytes. The alerts service 104 or the user device 106 selects one of the content type attributes 204 and processes the content data stored in the content data attribute 206 associated therewith.

The data packet 202 also includes a device hint attribute 208 such as device hint attribute #1 through device hint attribute #Z storing a characteristic value representative of a specific device 106. The device hint attribute 208 is associated with one of the content type attributes 204.

A notification message includes relevant information such as a recipient, content, formatting information, and metadata (e.g., hidden) information about properties of the message. Content refers to the part of the message with human-readable data that is presented to the user. The content may also contain formatting information specific to the endpoint. Alternatively or in addition, the content includes non-readable content such as extensible markup language (XML) data.

The schema for the notification may provide a notification class, title, and a subscription identifier to identify the notification, and the notification may be stamped with a unique identifier and time. Other information may describe whether an automated agent or a person generated the notification, information volatility (e.g., time-to-live data, replaceable with update).

The schema for notification also provides attributes that detail the type of content in the body (e.g., textOnly, textAudio, textGraphics, AudioGraphics), and the size of the notification (e.g., in bytes). Notifications express their value, for example as scalar numbers, cost amounts, or qualitative tags (e.g., high, medium, low) so that the alerts service 104 determines whether and how to deliver the notification. Notifications also have the ability to express dynamics of value (e.g., how values change over time with delays). Multiple functions are available including deadline, stepwise, half-life and sigmoid functions.

In the schema, consideration may also be given to a privacy or authority model for writing and reading attributes of metadata to minimize "spamming" via the alerts service 104. To this end, a standard tag for representing authorship of key fields (e.g., which fields in the schema, written or overwritten by which author and/or process) may be employed. The notification may thus provide security and authorization by maintaining a record of who wrote and who can read attributes and by authenticating senders. Consideration may also be given to allowing the option of encoding user routing preference information in the notification schema itself.

The notification schema contains information about preferences for rendering of content in different ways including preferences for rendering different approximations of the complete content of a message depending on device capabilities. Content to be rendered includes multiple components or types of information such as text, hypertext markup language (HTML), graphics, video, audio, and combinations thereof. Content encodings like multipurpose Internet mail extensions (MIME) allow different devices 106 to render a message based on rendering abilities and encoded policies. For a cross-device notification platform, different formulations of content may be encoded and transmitted for different devices 106. Also, preferences in the notification schema may be encoded to indicate preferences for different devices 106 based on device capabilities given content at hand and how different devices 106 should best handle the rendering of portions of content.

Rendering preferences allow for a piece of content to be summarized in different ways depending on the device rendering capabilities. Also, information about the ability to render may be an important consideration for the alerts service 104 to consider. For example, the alerts service 104 decides whether to wait for a device 106 with an ability to render a more complete rendition of the information to become available or to send an approximate version of the information immediately. In another example, if a piece of content has graphics and text (e.g., directions to a location with a map graphic), an available cell phone might only be able to render text on its small display. However, if the alerts service 104 waits an hour, a desktop device with the ability to render both graphics and text may become available.

Content may be encoded in different ways for rendering by devices 106 with different capabilities. In one approach, the content contains a distinct formulation for different classes of rendering ability. For example, an extended piece of text, containing more detailed descriptions, might be made available for the situation where the graphic is not available. For devices with text and graphics capability, content containing a shorter text description coupled with a graphic might be made available. Alternatively, a single piece of multipart content may be provided. In such a case, the alerts service 104 or the user devices 106 make an effort to select portions of the single multipart content for processing and ignore or delete the other information. Also, the content provider 102 or user may have different preferences about different subsets and types of renderings on different available devices 106.

In one embodiment, the data structure includes hints (e.g., stored in the device hint attribute 208) to enable the alerts service 104 or end user device 106 to match device capabilities with content from the notification. One way in which this may be accomplished is for the schema information to include preference ordering on approaches to content rendering. Another way is to provide a fidelity measure with each alternative rendering option. By way of example, consider an example of a notification about a traffic jam containing directions about re-routing the user. The information contains audio directions, a text description, and a map graphic. In this example, rendering on a device 106 that can handle all three components without truncation for the text is assigned a fidelity of 1.0, a device 106 capable of handling only the map graphic and text is assigned a fidelity of 0.75, and a device 106 that handles the text only is assigned a fidelity of 0.5. These preferences may be encoded as fidelity tags on different rendering types by the content provider 102, or may be stored as general policies in the user information preferences that overwrite or reorder the preferences encoded initially in the notification schema by the content provider 102. In addition, a fidelity tag may be listed for each content data attribute 206 indicating a preference order for the processing of the content. User preferences may also be accessed to select the content and determine the timing and routing of the notification.

As an alternative to (or in addition to) being sent as its own message, schematized notification data may be embedded as an overlay on existing messaging and communication systems. For example, notification schema metadata may be included in the header (or hidden in the content) of email. Another example of providing a notification via a communication system includes overlaying the notification metadata on a telephone communication. In general, a schematized notification may accompany any transmission of data, and, as mentioned above, the encoding for the various schema metadata (such as the notification schema metadata) can be in different formats. For example, the metadata may be encoded in MIME for simple mail transfer protocol (SMTP) and in XML for simple object access protocol (SOAP) messages or session initiation protocol (SIP), depending on the protocol and application. As can be appreciated, the present invention is not limited to any one notification schema, but rather includes numerous alternatives for any given schema.

Notification Processing

In FIG. 2, the alerts environment includes the alerts service 104, a first memory area to store user routing preferences 110, and a second memory area to store at least one device characteristic 210 of one or more user devices 106. The first memory area stores an ordered list of the user devices 106. The second memory area stores the device characteristics 210 or content type identifying a processing capability of the device 106 including one or more of the following: hypertext markup language, text, graphics, extensible markup language, audio, and video. However, other device characteristics 210 may be stored. The first memory area and the second memory area may be located on the same or separate computer-readable media. The alerts service 104 receives the data packet 202 from the content provider 102 and delivers the received data packet 202 to the devices 106 based on the user routing preferences 110 stored in the first memory area and the device characteristics 210 stored in the second memory area.

In FIG. 2, the alerts service 104 has access to one or more computer-readable media having computer-executable components for processing the notification. The components include an interface component 212, a configuration component 214, and a filter component 216. The interface component 212 accesses a data structure representing the notification. The data structure has one or more content type fields. Each of the content type fields has a content data field associated therewith. In one form, the interface component 212 receives the data structure via a data communication network from the content provider 102. The configuration component 214 determines at least one characteristic of the device 106 based on a capability of the user device 106 to process content data. The filter component 216 selects one of the content type fields from the data structure accessed by the interface component 212 for processing by the device 106 based on the characteristic determined by the configuration component 214.

Another component includes an assembly component 218 defining a filtered data packet including the selected content type attribute 204 and content data attribute 206 associated therewith. The assembly component 218, when executed, delivers the filtered data packet to the device 106 via the data communication network for processing. Alternatively, the assembly component 218, when executed, effects the delivery of the defined data packet to the device 106 via the data communication network for processing.

Content Selection

Figure 3:
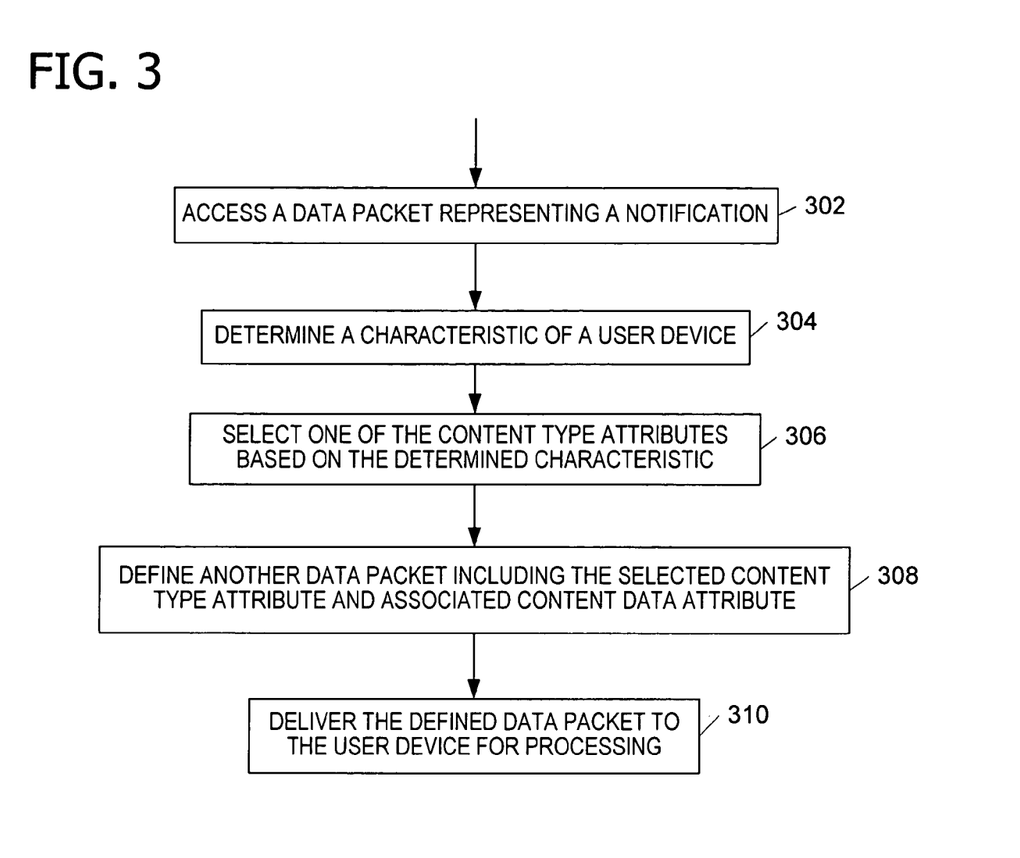
FIG. 3 is an exemplary flow chart illustrating operation of software executed by an alerts service or by an end user computing device.

Referring next to FIG. 3, a flow chart illustrates the selection of content for processing based on user routing preferences and stored device characteristics. In FIG. 3, a method processes a notification by accessing a data packet representing the notification at 302, determining at least one characteristic of a user device based on a capability of the user device to process content data at 304, and selecting one of the content type attributes in the notification for processing by the user device based on the determined characteristic at 306. In one form, accessing the data packet comprises receiving the data packet via a data communication network from a content provider. Determining the characteristic may include accessing user routing preferences which identify specific user devices and characteristics thereof. Selecting one of the content type attributes includes selecting one of the content type attributes to process based on the determined characteristic of the user device and the characteristic value stored in the device hint attribute. Alternatively or in addition, selecting one of the content type attributes comprises selecting the content data attribute having content data with the longest length that fits on a display associated with the user device. The method may also operate to truncate content data stored in the content data attribute associated with the selected content type attribute. Truncating occurs responsive to a size restriction associated with a display of the user device. The method illustrated in FIG. 3 may be embodied as computer-executable instructions executed by the alerts service or by the user device.

The alerts service defines a filtered data packet including the selected content type attribute and content data attribute associated therewith at 308. The alerts service delivers the filtered data packet via the data communication network to the user device for processing at 310. Alternatively, the alerts service acts as a gateway or interface and effects the delivery of the filtered data packet via the data communication network to the user device for processing. One or more computer-readable media have computer-executable instructions for performing the method illustrated in FIG. 3. In one embodiment, the method illustrated in FIG. 3 is implemented with extensible stylesheet language transformations (XSLT).

Exemplary Operating Environment

Figure 4:
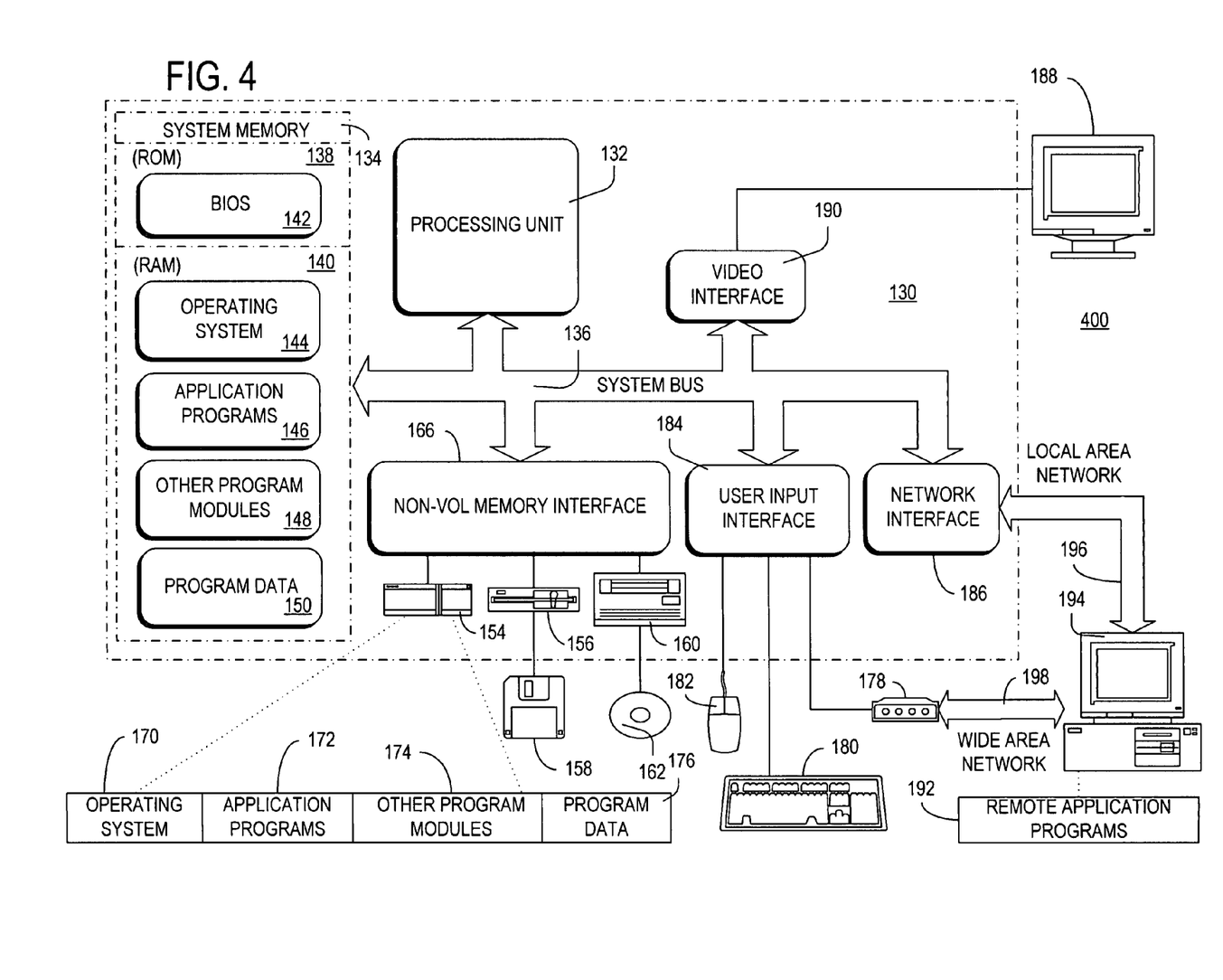
FIG. 4 is a block diagram illustrating one example of a suitable computing system environment in which the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media. Computer storage media are distinct from and DOES NOT include communication media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIG. 3 to process a notification. In particular, a method for processing a notification to be delivered to a user device via a data communication network includes accessing, prior to delivery of the notification, a data packet representing the notification. The data packet has at least one content type attribute. The content type attribute has a content data attribute associated therewith storing non-rendered content data. The method also includes determining at least one characteristic of a user device based on a capability of the user device to process content data. The method further includes selecting one of the content type attributes for processing by the user device upon delivery of the notification based on the determined characteristic. The method further includes delivering the notification to the user device as a function of the selected content type attribute to provide content data formatted for the user device.

Examples

The following examples further illustrate the invention. The following data structure illustrates various exemplary device hints and associated content.

Hint=<email>
    <b>hi<\b>
    hint=<mobile>
    <b>hi mobile <\b>
    hint=<instant messaging.
    Action=pagea.net
    Text=hello
    Hint=<game device>
    Game=invaders
    Game ID=11111
    Text=Peo invites you to play The following is an exemplary data packet having content formatted for email and mobile devices.

<A:Meta baseUrl="http://www.contentprovider.com">
    <A:Action url="/action.aspx"/>
    <A:Subscr url="/subscr.aspx"/>
    <A:Icon url="/icon.jpg"/>
    A:Subject>This is your alert subject</A:Subject>
    </A:Meta>
    <A:Content baseUrl="http://www.contentprovider.com/ext">DefaultDefault<A:View deviceHint="EMAIL"contentType="text/html"><![CDATA[<html><body><h1>Hello</h1><h2>Here is your alert of the day.</h2></body></html>]]></A:View>
    <A:View deviceHint="EMAIL">Some sample email in plaintext.</A:View>
    <A:View deviceHint="MOBILE">Some sample content for mobile</A:View>
    <A:View action="/action.aspx" deviceHint="MESSAGING" url="/ext.aspx?type=MESSAGING"/>
    </A:Content>
    :
    <Content>

Content providers specify as many messages as desired within the <A:Content>element. The content providers do not need to specify content for each endpoint. If an endpoint is missing, then the "default" presentation (e.g., plaintext) is selected. The action attribute identifies an action available to the user to take in response to the alert. The action attribute may include a relative or absolute network address and, if specified, the network address overrides the default action of the alert. Exemplary device hints include EMAIL, MOBILE, INSTANT MESSAGING, LOG, and TEXT.

Content providers may specify the device hint name. There may be multiple device hints per content type. Content types include, but are not limited to, "text/plain", "text/html", and "text/xml." If no type is specified or an invalid value is in the type field, the text/plain type is assumed by default. If the alerts service matches the user's preferred device with one of the device hints in the notification, the alerts service forwards only the content associated with the matched device hint to the endpoint. If the alert is going to an endpoint for which the content provider has not specifically specified content or if no device hint has been specified, the alerts service forwards the entire alert allowing the endpoint to choose the content. Specification of the device hint by the content provider is not mandatory. The endpoint device selects the appropriate content for the device.

In a gaming example, a game device becomes an alerts endpoint and displays plain text messages only. A content provider sends out alerts with the following schema:

<A:Content>
    <A:Base>Your account balance is less than $100.</A:Base>
    <A:Extended>
    <A:View hint="EMAIL SUBJECT">Account notice</A:Item>
    <A:View hint="EMAIL" type="text">Dear Customer, this email is to inform you . . . (lots more stuff here)</A:Item>
    <A:View hint="MESSAGING" type="HTML"><![CDATA[<html><body><h1>Notice!</h1><p>Your account balance is less than $100</body></html>]]></A:Item>
    <A:View hint="MESSAGING" type="TEXT">Your account balance is less than $100. Please deposit additional funds immediately.</A:Item>
    </A:Extended>
    </A:Content>

The alerts service receives the packet and determines that the whole packet should be sent to the user's game device based on the user routing preferences, the designated recipient of the alert, and the lack of a device hint directed specifically to a game device. The game device checks the lengths of each of the device hints and picks BASE as the best message to process.

In another example, a company sends an alert to a user indicating that an ordered book has arrived. The user clicks on an action link in the alert to see more information about the order such as an expected ship date. If the user is offline when the alert is delivered, the alert is directed to an email account. The company includes the expected delivery date, a link to track the order, and a list of other related books the user might be interested in.

In yet another example, a service connects players in an online game. A packet for use by this service may include multiple views as show in Table 1 below.

TABLE 1

Exemplary Content Types and Data.

| | |
|---|---|
| Content Type | text/plain |
| Device Hint | Instant Messaging |
| Content | Another free online player has been located. Click here to get details on how to set up your game. |
| Content Type | text/html |
| Device Hint | Email |
| Content | Another free online player has been located. Click <a href="http://teamup.gamea.net?session=123">here</a> to get details on how to set up your game. |
| Content Type | text/xml |
| Device Hint | Game Device |
| Content | <NewGame><br>  <ConnectTo><br>   <Game>Game A</Game><br>   <Address>113.14.81.1:4711</Address><br>   <Credentials>123sadf1348fdsal</Credentials><br>  </ConnectTo><br></NewGame> |

If the user only has an instant messaging and/or email endpoint, the user will receive a message prompting the user to click the message to come to the web page which contains information about how to set up the game. However, if the user has a connected game console, then information about the network address of the other player and some credentials for setting up the session are passed to the game device. The game device prompts the user to start an online game and connects the two players per the user's response. As such, the actual content of the alert (e.g., the game identifier, network address, and credentials) includes information for an application (e.g., executing on the game device). The application takes appropriate action based on the content.

In an example in which the user device is a smart personal object implementing an information service such as a SMART PERSONAL OBJECT TECHNOLOGY (SPOT) brand of information or telecommunication service. Devices such as watches receive real-time alert content (e.g., weather alerts) over frequency-modulated (FM) radio. Such devices receive text/plain content similar to a mobile telephone, but are also capable of receiving richer content such as an icon describing the current weather forecast. The content provider does not have to customize a message specifically for these devices. If a user has such a device, the user sets up a routing rule (e.g., stored in the user routing preferences) and the device will receive the best content that may be rendered on that particular device. Further, if the content provider wants to target specific device features, the content provider adds a specific view with a specific device hint to the notification packet.

Those skilled in the art will note that the order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method for processing a notification, said method comprising:
   accessing, by a user device, a data packet representing the notification, said data packet having a plurality of content type attributes each defining one multimedia component of a plurality of multimedia components to be rendered by the user device, each content type attribute having a content data attribute associated therewith storing non-rendered content data;
   determining a single fidelity measure of the user device, said fidelity measure singularly and numerically indicating the total capability of the user device to render all of the plurality of multimedia components of the notification, said fidelity measure having a maximum value of 1;
   determining a fidelity tag for each content data attribute from the data packet indicating a preference order for the non-rendered content data of the each content data attribute, said determining further comprising reordering the indicated preference order based on user-specified preferences; and
   selecting one of the plurality of content type attributes for processing by the user device based on the fidelity measure, wherein the user device executes an application, said application performing an action based on the non-rendered content data associated with the selected content type attribute, and wherein the user device renders the notification in accordance with the fidelity measure and the fidelity tag, wherein said selecting one of the content type attributes further comprises selecting the content data attribute having content data with the longest possible length based on a size restriction of a display associated with the user device.

2. The method of claim 1, further comprising defining a filtered data packet including the selected content type attribute and content data attribute associated therewith.

3. The method of claim 2, further comprising sending the filtered data packet to a data communication network for processing.

4. The method of claim 2, further comprising effecting a delivery of the filtered data packet via a data communication network to the user device for processing.

5. The method of claim 1, wherein the data packet comprises a device hint attribute storing a characteristic value representative of a specific user device, said device hint attribute being associated with one of the content type attributes, and wherein selecting one of the content type attributes comprises selecting one of the content type attributes to process based on the determined characteristic of the user device and the characteristic value stored in the device hint attribute.

6. The method of claim 1, wherein accessing the data packet comprises receiving the data packet via a data communication network from a content provider.

7. The method of claim 1, further comprising truncating content data stored in the content data attribute associated with the selected content type attribute, wherein said truncating occurs responsive to the size restriction associated with the display of the user device.

8. One or more computer-readable storage media having computer-executable instructions for performing the method of claim 1.

9. One or more computer-readable storage media having computer-executable components for processing a notification, said components comprising:

an interface component to access a data structure representing the notification, said data structure having a plurality of content type fields, each content type field defining one multimedia component of a plurality of multimedia components of the notification, each of said content type fields having a content data field associated therewith, wherein one of the content type fields has a content data field associated therewith storing non-rendered content data relating to the set up of an online game;

a configuration component to determine a single fidelity measure of a game console, said fidelity measure singularly and numerically indicating the total capability of the game console to render all of the plurality of multimedia components of the notification and to determine a fidelity tag from the data structure for each content data field indicating a preference order for the non-rendered content data of the each content data field, wherein the indicated preference order is reordered based on user-specified preferences; and a filter component to select one of the content type fields from the data structure accessed by the interface component for processing by the game console based on the fidelity measure determined by the configuration component, said filter component performing said selecting by selecting the content data field having content data with the longest possible length based on a size restriction of a display associated with the game console, wherein the game console receiving the notification executes an application, said application performing an action based on the non-rendered content data of the notification, and wherein the game console renders the notification in accordance with the fidelity measure and the fidelity tag.

10. The computer-readable storage media of claim 9, further comprising an assembly component to define a filtered data packet including the selected content type field and content data field associated therewith.

11. The computer-readable storage media of claim 10, wherein the assembly component, when executed, sends the filtered data packet to a data communication network for processing.

12. The computer-readable storage media of claim 10, wherein the assembly component, when executed, effects the delivery of the defined data packet to the computing device via a data communication network for processing.

13. The computer-readable storage media of claim 9, wherein the interface component receives the data structure via a data communication network from a content provider.

14. A system for processing a notification comprising a plurality of multimedia components, said system comprising:

a first memory area to store routing preferences of a user;

a second memory area to store a single fidelity measure of a game console associated with the user, said fidelity measure singularly and numerically indicating the total capability of the game console to render all of the plurality of multimedia components of the notification, said fidelity measure having a maximum value of 1; and an alerts service adapted to receive a data packet from a content provider, said data packet having a plurality of content type attributes each defining one multimedia component of the plurality of multimedia components to be rendered by the game console, each content type attribute having a content data attribute associated therewith storing non-rendered content data; and a third memory area to store a fidelity tag for each content data attribute indicating a preference order for the non-rendered content data of the each content data attribute, wherein the alerts service delivers the received data packet to the game console based on the routing preferences stored in the first memory area and the fidelity measure stored in the second memory area, wherein said received data packet includes the non-rendered content data, and wherein the game console receiving said data packet renders the notification in accordance with the fidelity measure and the fidelity tag.

15. The system of claim 14, said first memory area to store an ordered list of one or more computing devices of the user.

16. The system of claim 14, said second memory area to store the device characteristic identifying a processing capability of the computing device including one or more of the following: hypertext markup language, text, graphics, extensible markup language, audio, and video.

17. The system of claim 14, wherein the non-rendered content comprises extensible markup language data.

18. A method for processing a notification to be delivered to a game console via a data communication network, said method comprising:

accessing, prior to delivery of the notification, a data packet representing the notification, said data packet having a plurality of content type attributes each defining one multimedia component of a plurality of multimedia components of the notification, each said content type attribute having a content data attribute associated therewith storing non-rendered content data relating to the set up of an online game;

determining a single fidelity measure of a game console, said fidelity measure numerically indicating the singular capability of the game console to process all of the plurality of multimedia components of the notification;

determining a fidelity tag from the data packet for each content data attribute indicating a preference order for processing the non-rendered content data of the each content data attribute, said determining further comprising reordering the indicated preference order based on user-specified preferences;

selecting one of the plurality of content type attributes for processing by the game console upon delivery of the notification based on the determined fidelity measure and the determined fidelity tag, said selecting further comprising selecting the content data attribute having content data with the longest possible length based on a size restriction of a display associated with the user device; and sending the notification to the data communication network as a function of the selected content type attribute to provide content data formatted for the game console, wherein the game console executes an application, said application performing an action related to the set up of an online game based on the non-rendered content data associated with the selected content type attribute, and wherein the user device renders the notification in accordance with the fidelity measure and the fidelity tag.

19. The method of claim 18, wherein accessing the data packet comprises receiving the data packet via the data communication network from a content provider.

20. The method of claim 18, wherein sending the notification to the game console comprises:

defining a filtered data packet including the selected content type attribute and content data attribute associated therewith; and sending the filtered data packet to the data communication network to provide content data formatted for the game console.

21. One or more computer-readable storage media having computer-executable instructions for performing the method of claim 18.

* * * * *